Feb. 16, 1937.     G. D. ANGLE     2,071,193
CONNECTING ROD CONSTRUCTION FOR RADIAL TYPE INTERNAL COMBUSTION ENGINES
Filed April 12, 1934

INVENTOR.
GLENN D. ANGLE.
BY Allen + Allen
ATTORNEYS.

Patented Feb. 16, 1937

2,071,193

UNITED STATES PATENT OFFICE 2,071,193

CONNECTING ROD CONSTRUCTION FOR RADIAL TYPE INTERNAL COMBUSTION ENGINES

Glenn D. Angle, Cincinnati, Ohio

Application April 12, 1934, Serial No. 720,265

9 Claims. (Cl. 74—580)

My invention relates to a novel type of engine construction for internal combustion engines of the radial type.

In an internal combustion engine of the radial type, there are two types of articulated connecting rod construction. In the first type the big end construction. In the first type the big end spool or cluster is held upon the crank pin by means of bolts, the crank shaft is of the solid type and the connecting rod may be installed on the crankshaft. The other type has what is ordinarily termed a solid ring big end, in which the big end spool or cluster is slipped over the crank pin and the crankshaft may be said to be built up. It is to the latter type of construction that my invention relates.

In the solid ring big end type of master connecting rod, there has always been required a number of slow and expensive machining operations in order to form the big end so that a suitable means of attachment can be provided for the link or auxiliary rods. It is the object of my invention to provide a method of assembling the articulated connecting rod construction, in which the cost of assembling may be materially cheapened, expensive machining operations are avoided, and the weight may be materially reduced. At the same time, it is my object to improve the efficiency of the connecting rod bearings.

It is customary practice to use steel forgings for the master rod, as no other material is suitable for providing the necessary supports for the link rod wrist pin. In many designs of this character, the link rods are forged from duraluminum, which is a heat-treated alloy of aluminum. Such rods are not only lighter than steel, but they have equivalent strength, and can be inexpensively made. They require no bushings, and are so inexpensive that when the bearings become worn, the rods can be discarded rather than to go to the expense of inserting bushings.

It has hitherto been impractical to employ duraluminum for the master connecting rod, because it has been difficult to provide suitable bearings for the crank pin at the big end. If the bearing metal of the bearing is applied directly to the duraluminum forgings, the temperature has to be raised to such a degree that the strength given to the duraluminum forgings in the heat-treatment is destroyed. If the bearings are fitted by a freezing treatment the same thing is true. If bearing shells of steel or bronze lined with white metal are used, the expansion of the duraluminum under heat causes the bearing shells to become loose during operation of the engine; and furthermore, the duraluminum does not provide a suitable support for the wrist pins if the dimensions of the design are kept within ordinary limits.

It is specifically the object of my invention to provide a construction which will permit the use of duraluminum for the master connecting rod and link rods, and at the same time avoid the objections to which I have referred. As I have stated, it is also an object to avoid a great deal of the previously required manufacturing expense.

Figure 1:
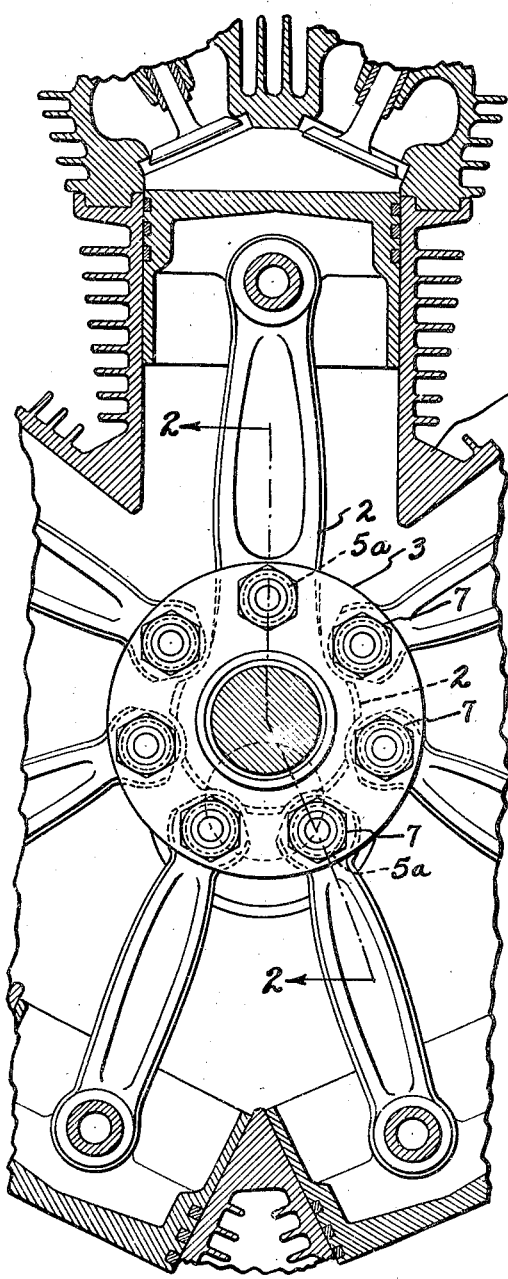
Figure 1 is a sectional view of the interior of an engine of the radial type equipped with my connecting rod construction.
Figure 2:
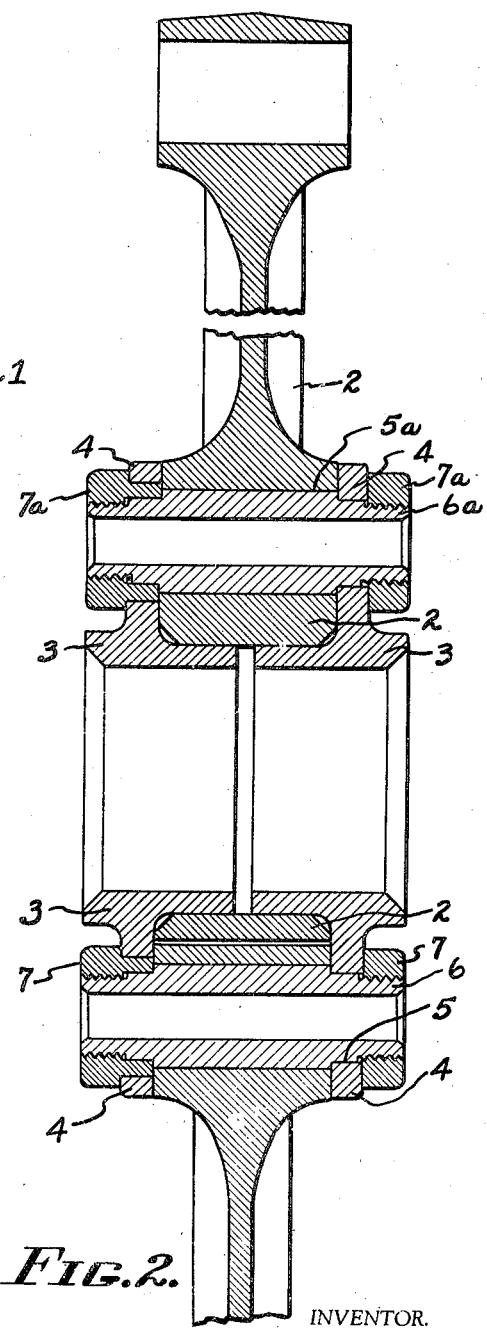
Figure 2 is a sectional view taken along the lines 2—2 in Figure 1.

The engine casing 1 is of the cast-in-block type, which forms the subject matter of my co-pending application Serial No. 720,266, filed April 12, 1934. The master connecting rod is indicated at 2. A pair of steel bearing shells 3, having internal bores lined with white metal, are pressed into the bore of the crank pin end of the master connecting rod. The forging is heated sufficiently to provide a shrink fit during assembly, so that the usual temperature, due to operation of the engine, will not cause the forging to expand to the extent that it will become loose on the outside of the bearing shells.

The steel flanges 4 of the bearing shells have peripheral bores 5 into which the wrist pins 6 of the link rods are fitted. The wrist pins which are of conventional material are held in position by lock-nuts 7, or other suitable means, to prevent rotative or axial movement. One of these wrist pins 6a is securely held in position by lock-nuts 7a, which effectively prevent rotative movement of the bearing shells relative to the master connecting rod. The wrist pin 6a carries the torque or bending moments caused by the forces of the link rods, which do not at all times act in a plane passing through the axis of the crank pin.

The machine work required to produce the construction is very simple. The flanges on the bearing shells are turned, avoiding the slow and expensive milling operation heretofore required. The flanges are of similar shape and size, the wrist pins are identical, so that a great number of different parts are eliminated. The construction not only permits the use of a master rod of extremely light weight, but the flanges and wrist pins can be made lighter than have heretofore been necessary.

Having thus described my invention, what I claim as new and desire to secure by Letters Patent, is:

1. In a radial type internal combustion engine, an articulated connecting rod construction comprising a forged master connecting rod and link connecting rods composed of a non-ferrous alloy, wrist pins for said link rods, bearing shells having steel flanges, and means on said flanges for supporting the wrist pins of the link connecting rods.

2. A radial type internal combustion engine having a forged master connecting rod and link connecting rods of non-ferrous alloy, wrist pins for said link rods, bearing shells of a ferrous alloy, and means formed as part of the bearing shells for supporting the wrist pins of the link connecting rods.

3. A radial type internal combustion engine having a forged master connecting rod and link connecting rods of non-ferrous alloy, wrist pins for said link rods, bearing shells of a ferrous alloy, and means formed as part of the bearing shells for supporting the wrist pins of the link connecting rods, said means formed integrally with said bearing shells.

4. In an articulated connecting rod construction, a forged master rod, and link rods having wrist pins, of non-ferrous alloy, turned bearing shells having flanges, and the wrist pins of the link connecting rods supported in said flanges.

5. In a radial type internal combustion engine having a master connecting rod and link rods of non-ferrous metal, a two part crank pin bearing of ferrous metal shrunk in said master rod and having an internal bore surfaced with bearing metal, said bearing having flanges provided with means for connecting with said link rods.

6. In a radial type internal combustion engine having a master connecting rod and link rods of non-ferrous metal, said master rod having a crank pin bearing of ferrous metal shrunk thereto, and means extending from said bearing for engaging the link rods.

7. In a radial type internal combustion engine having a master connecting rod and link rods, said master rod having a crank pin bearing of ferrous metal shrunk thereto, and means extending from said bearing for engaging the link rods, said master rod and link rods being composed of a light, non-ferrous alloy.

8. A radial type internal combustion engine having a non-ferrous master connecting rod and link rods and a pair of steel bearings shrunk in from opposite sides of said connecting rod, and means formed integrally with said bearing for supporting the link rods of said engine.

9. A radial type internal combustion engine having a non-ferrous master connecting rod and link rods and a pair of steel bearings shrunk in from opposite sides of said connecting rod, means formed integrally with said bearing for supporting the link rods of said engine, said means comprising turned flanges.

GLENN D. ANGLE.